May 26, 1925.
C. P. GORMLY
1,539,476
AUTOMOBILE ATTACHMENT
Filed April 22, 1924
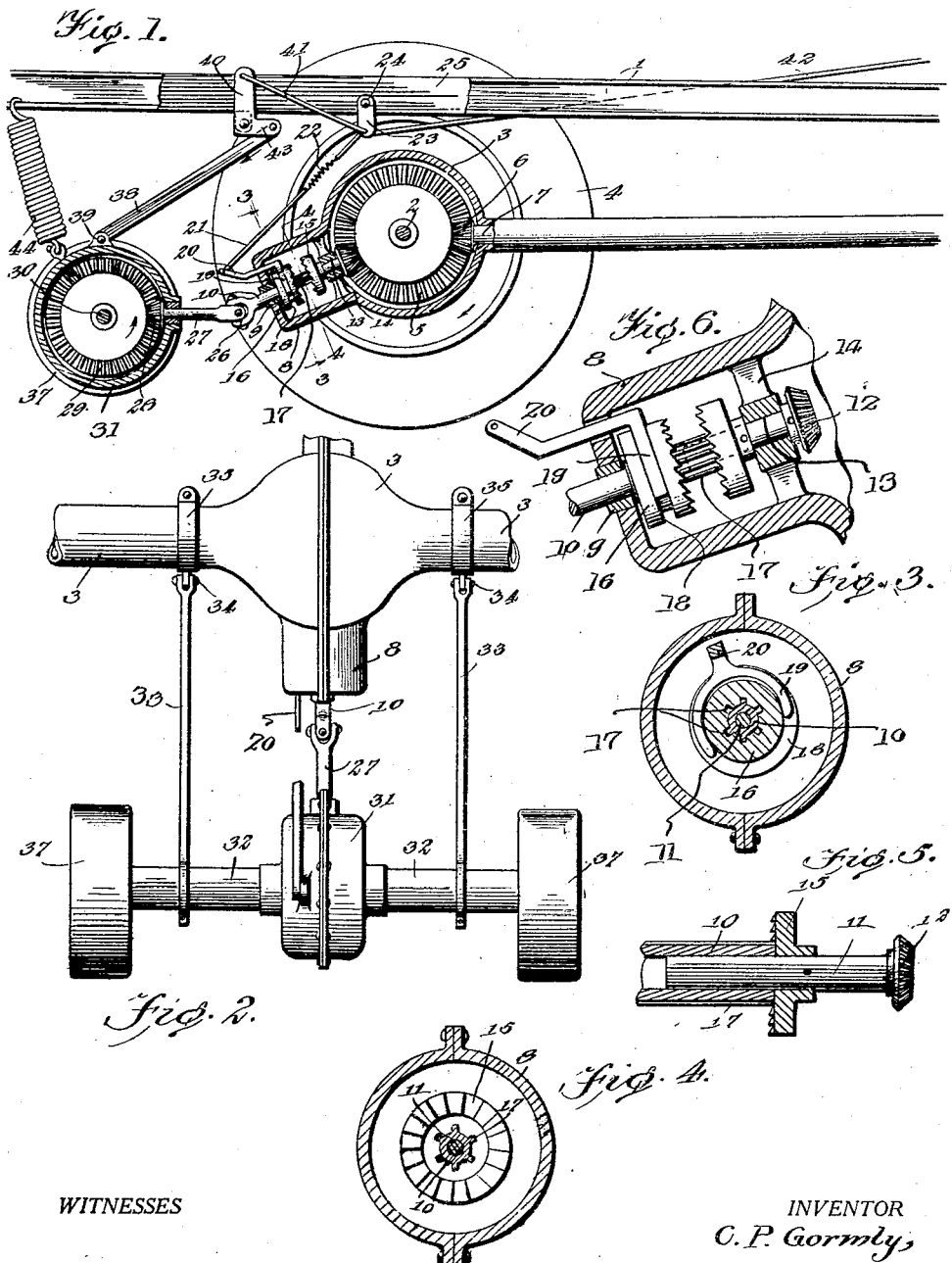
WITNESSES
INVENTOR
C. P. Gormly,
BY
ATTORNEYS Patented May 26, 1925.

1,539,476

UNITED STATES PATENT OFFICE.

CHARLES P. GORMLY, OF LONG BEACH, CALIFORNIA.

AUTOMOBILE ATTACHMENT.

Application filed April 22, 1924. Serial No. 708,294.

*To all whom it may concern:*

Be it known that I, CHARLES PATRICK GORMLY, a citizen of the United States, and a resident of Long Beach, in the county of Los Angeles and State of California, have invented certain new and useful Improvements in Automobile Attachments, of which the following is a specification.

This invention relates to automobiles and more particularly to an auxiliary braking means manually thrown into operation with the differential.

An object of the invention is the provision of a device for either supplementing the usual braking apparatus of a car or for acting independently of the braking mechanism for maintaining an automobile against movement when the car has been stopped or when the engine has become stalled.

A further object of the invention is the provision of a device operatively connected with the usual ring or master gear of the differential of an automobile whereby the tendency of the rear wheels to rotate after the braking mechanism has been applied will cause rotation of the master gear of the differential and such rotation will be reversely imparted to the auxiliary braking device which is in the form of wheels acting in opposition to the wheels of the car.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a longitudinal section of the differential of an automobile and the emergency braking device constructed in accordance with the principles of my invention.

Figure 2 is a fragmentary plan view of the device shown in Figure 1.

Figure 3 is a transverse section taken along the line 3—3 of Figure 1.

Figure 4 is a transverse section taken along the line 4—4 of Figure 1.

Figure 5 is a longitudinal vertical section showing the connection of the sliding shaft.

Figure 6 is an enlarged detail sectional view of the clutch mechanism.

Referring more particularly to the drawing, 1 designates a beam of the chassis of the automobile suspended above the rear axle 2 and rear axle housing 3 by the usual vehicle springs. The rear axles as is usual, are connected with the rear wheels 4 and the ring or master gear 5.

A driving gear 6 on the drive shaft 7 meshes with the ring gear and drives the same. The housing 3, formed in sections, as is usual, has a rear extension 8 which may be formed integrally with the section or separately. This extension is provided with a bearing 9 at its outer end in which is revolubly mounted a stub shaft 10. The inner end of this stub shaft is hollow, as shown in Figure 5, and receives the inner end of a second shaft 11 provided with the bevelled gear 12 in mesh with the master gear 5. The inner end of the shaft 11 is mounted in a bearing 13 carried by the spider 14 rigid with the housing 8.

One member 15 of the dog clutch is rigidly connected with the shaft 11 while the other member 16 is slidable on the shaft 10 and has grooves extending radially outward from its central passage adapted to be engaged by the keys 17 on the outer wall of the shaft 10 so that the clutch member 16 is adapted to revolve the shaft 10 through shaft 11 and the members of the dog clutch but is permitted a certain sliding movement on the shaft 10 to permit the member 16 to be released from its engagement with the member 15.

The member 16 is provided with a groove 18 adapted to be engaged by a fork 19. A handle 20 is connected with the fork and extends through a passage in the rear wall of the casing 8 and is moved back and forth by a link 21 and a spring 22 connected with an oscillating lever 23, the lever being pivoted at 24 to a plate 25 secured to the beam 1.

A universal joint, as shown at 26, connects the shaft 10 with a shaft 27 whereby rotation of the shaft 10 will cause rotation of the shaft 27, a bevelled gear 28 and a ring gear 29 rigidly connected with a shaft 30. The bevelled gear 28, ring gear 29 and shaft 30 are located within a housing 31 and a laterally extending secondary axle housing 32. Links 33 connected with the housing 32 are extended inwardly and have pivotal connections, as shown at 34, with a band 35 mounted upon the automobile axle housing 3. The ends of the axles 30 are connected with solid tread wheels 37 which are adapted to engage the street whenever it is intended to apply the brakes.

A link 38 pivotally connected at 39 with the housing 31 has pivotal connections with a bell crank lever 40. A link 41 connects the free end of the bell crank lever with the lever 23, said bell crank lever being pivoted on a bracket (not shown) which is carried by the frame. A link 42 connects the lever 23 with a foot pedal adjacent the side of the driver.

The operation of my device is as follows:

In case of emergency when it is desired to apply the brakes constructed in accordance with the principles of my invention, the foot pedal is depressed and through the link 42 the lever 23 is rocked thereby shifting the link 21, fork 19 and the member 16 of the dog clutch into engagement with the member 15 of the dog clutch whereby the shafts 10 and 11 are rocked for simultaneous rotation. Rotation of shaft 10 causes rotation of shaft 27, gear 28, ring gear 29, axles 30 and the rear wheels 37.

While the lever 23 is rocked link 41 causes rocking of the bell crank lever 40 so that the lower end 43 of the bell crank lever 40 is moved in the direction indicated by the arrow in Figure 1 and the link 38 is likewise shifted in the same direction whence the housing 31 together with the wheels 37 will be moved downwardly against the tension of the spring 44 and force the rubber tired wheels in engagement with the surface of the street and since the gear 29 is rotating in the direction indicated by the arrow and the ring gear 5 is rotating in the direction indicated by the adjacently disposed arrow the wheels 37 will be reversely rotated with respect to the automobile wheels 4, thus placing a resistance to the movement of the wheels 4 and checking the momentum of the car as desired.

Spring 44 is adapted normally to maintain the wheels 37 upwardly and out of engagement with the surface of the street when not employed for braking purposes.

What I claim is:

1. In an automobile, the combination of a rear axle housing, a secondary axle, a pair of wheels mounted on said axle and means for swinging the axle and the wheel from the rear axle housing whereby said wheels will cooperate when placed upon the ground with the wheels of the automobile for aiding in braking the same.

2. In an automobile, the combination of a ring gear of the differential of the automobile, a pair of auxiliary wheels swingable adjacent the rear wheels of the automobile, and means operatively connecting the rear wheels with the ring gear for causing revolution of the auxiliary wheels in a reverse direction to the rotation of the rear wheels.

3. In an automobile, the combination of a ring gear of the differential of the automobile, a pair of auxiliary wheels swingable adjacent the rear wheels of the automobile, means operatively connecting the rear wheels with the ring gear for causing revolution of the auxiliary wheels in a reverse direction to the rotation of the rear wheels, and means for elevating or lowering the wheels from the ground.

4. In an automobile, the combination of a ring gear of the differential of the automobile, a pair of auxiliary wheels swingable adjacent the rear wheels of the automobile, means operatively connecting the rear wheels with the ring gear for causing revolution of the auxiliary wheels in a reverse direction to the rotation of the rear wheels, and means for causing engagement or disengagement of the operating means between the ring gear and the rear wheels.

5. In an automobile, the combination of a ring gear of the differential of the automobile, a pair of auxiliary wheels swingable adjacent the rear wheels of the automobile, means operatively connecting the rear wheels with the ring gear for causing revolution of the auxiliary wheels in a reverse direction to the rotation of the rear wheels, means for elevating or lowering the wheels from the ground, and means for causing engagement or disengagement of the operating means between the ring gear and the rear wheels.

6. In an automobile, the combination of a ring gear of the differential of the automobile, an auxiliary axle, auxiliary wheels mounted for rotation with the axle, a gear connected with the auxiliary axle, a flexible shaft extended between the ring gear and the gear on the auxiliary axle and gears at the end of the flexible shaft in mesh respectively with the ring gear and the gear on the auxiliary shaft, means for swingably mounting the auxiliary wheels adjacent the rear wheels of the automobile, and means for elevating or lowering the rear wheels.

7. In an automobile, the combination of a ring gear of the differential of the automobile, an auxiliary axle, auxiliary wheels mounted for rotation with the axle, a gear connected with the auxiliary axle, a flexible shaft extended between the ring gear and the gear on the auxiliary axle and gears at the end of the flexible shaft in mesh respectively with the ring gear and the gear on the auxiliary shaft, means for swingably mounting the auxiliary wheels adjacent the rear wheels of the automobile, means for elevating or lowering the rear wheels, and a clutch mechanism adapted to be simultaneously operated with the lowering or raising of the auxiliary wheels for operatively connecting or disconnecting the auxiliary wheels with the ring gear of the differential.

8. In an automobile, the combination of a ring gear of the differential of the automobile, said ring gear being enclosed by a housing, said housing being provided with an extension, a shaft mounted in the housing, a gear on the shaft in mesh with the ring gear, a second shaft mounted in the housing, a clutch mechanism adapted to connect the first mentioned shaft to the second mentioned shaft, a pair of auxiliary wheels swingably mounted adjacent the rear wheels of the automobile, an axle carrying said wheels, a gear on the secondary axle, means connecting the second mentioned shaft with the gear on the secondary axle.

9. In an automobile, the combination of a ring gear of the differential of the automobile, said ring gear being enclosed by a housing, said housing being provided with an extension, a shaft mounted in the housing, a gear on the shaft in mesh with the ring gear, a second shaft mounted in the housing, a clutch mechanism adapted to connect the first mentioned shaft to the second mentioned shaft, a pair of auxiliary wheels swingably mounted adjacent the rear wheels of the automobile, an axle carrying said wheels, a gear on the secondary axle, means connecting the second mentioned shaft with the gear on the secondary axle, means for lowering the secondary wheels, a spring for maintaining the secondary wheels elevated, and means for operating the clutch.

10. In an automobile, the combination of a ring gear of the differential of the automobile, said ring gear being enclosed by a housing, said housing being provided with an extension, a shaft mounted in the housing, a gear on the shaft in mesh with the ring gear, a second shaft mounted in the housing, a clutch mechanism adapted to connect the first mentioned shaft to the second mentioned shaft, a pair of auxiliary wheels swingably mounted adjacent the rear wheels of the automobile, an axle carrying said wheels, a gear on the secondary axle, means connecting the second mentioned shaft with the gear on the secondary axle, means for lowering the secondary wheels, a spring for maintaining the secondary wheels elevated, means for operating the clutch, and means connecting the clutch operating mechanism with the secondary wheel lowering means for causing simultaneous engagement of the clutch and the lowering of the secondary wheels.

11. In an automobile, the combination of a running gear, means swingable from the running gear and adapted to engage the ground for resisting forward movement of the automobile in opposition to the action of the driving wheels.

12. In an automobile, the combination of a running gear and a braking means swingably mounted from the running gear adapted to engage the ground, a power plant, and means connecting the braking means with the power plant for causing operation of said means to resist forward movement of the automobile.

CHARLES P. GORMLY.